W. FULLAGAR, Dec'd.
B. B. SCHNEIDER, Assignee by mesne assignments of J. McGLENSEY and E. FULLAGAR, Administrator of W. FULLAGAR, Dec'd.
SHADES FOR GAS-LIGHTS.
No. 7,457. Reissued Jan. 2, 1877.
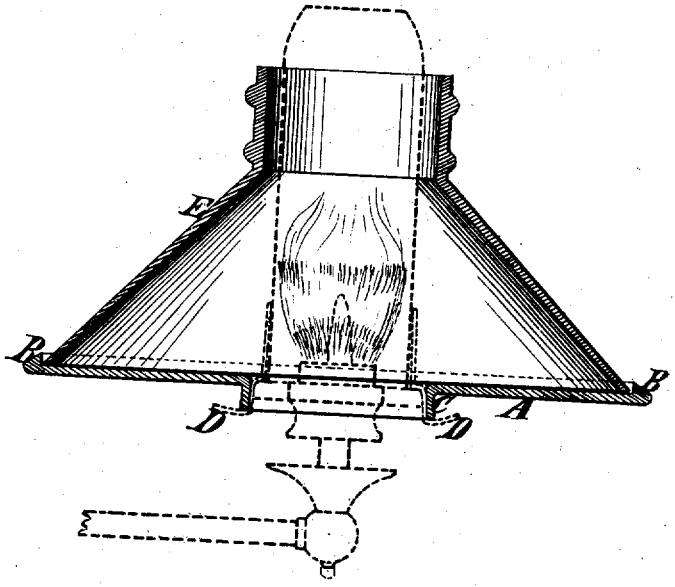
Witnesses:
Michael Ryan
Geo. Haynes
W. Fullagar
Inventor.
B. B. Schneider
assignee
By C. H. Wolcott & Co.
attys.
N. PETERS, PHOTO-LITHOGRAPHER, WASHINGTON, D. C.

UNITED STATES PATENT OFFICE.

BENNETT B. SCHNEIDER, OF NEW YORK, N. Y., ASSIGNEE, BY MESNE ASSIGNMENTS, OF JAMES McGLENSEY AND ELIZABETH FULLAGAR, ADMINISTRATORS OF WILLIAM FULLAGAR, DECEASED.

IMPROVEMENT IN SHADES FOR GAS-LIGHTS.

Specification forming part of Letters Patent No. 103,865, dated June 7, 1870; reissue No. 7,457, dated January 2, 1877; application filed December 21, 1876.

*To all whom it may concern:*

Be it known that WILLIAM FULLAGAR, late of Brooklyn, in the county of Kings and State of New York, now deceased, invented a new and useful Improvement in Shades for Gas and Lamp Burners, for which Letters Patent No. 103,865 were granted June 7, 1870; and I, BENNETT B. SCHNEIDER, of the city, county, and State of New York, owner, by assignment, of the entire interest in said patent, do hereby declare that the following is a full, clear, and exact description of said invention of said FULLAGAR, reference being had to the accompanying drawing, which forms part of this specification.

This invention relates to bottom shades for gas and other burners; and consists in an improved article formed of translucent material, allowing the passage of light, as, for instance, porcelain, having an outer rim or flange around, and of one piece with the bottom of said shade, to hold a side shade in place; also having, if desired, a neck or flange at its center opening, for supporting said bottom shade on the brackets of the burner.

This improved shade is not only applicable to gas-lights or burners, but also may be used with lamps, with slight changes in adaptation to the brass rings or supports, and is applicable, without change of the form represented, to what are known as the student's lamps.

The drawing represents a sectional elevation of a shade constructed and arranged according to these improvements, and as applied to a gas-burner.

A represents the improved bottom shade, consisting of a broad disk of translucent material, as, for instance, porcelain, with a rim or flange, B, at its outer edge, formed of the same piece with said disk, and a hole in the center, around which is a neck or flange, C, for resting on the brackets D, attached to the burner for holding the shade.

E represents an ordinary side shade, and D the bracket, which rests on the lamp, and which may serve to support a glass inner shade in the proper position. A represents the translucent bottom shade, having a circular aperture in the center, surrounded by a neck or flange, C, which is here shown to have a downward projection, and which rests on a shoulder of bracket D. This shade A permits the light, which is thrown downward, to pass through it, thus forming in one piece a shade holder and support for the same, fitting around the burner, the same being of material allowing the passage of light, making a convenient and efficient means of supporting a shade.

What is here claimed as new, and desired to be secured by Letters Patent, is—

1. In a base for burners, composed of material allowing the passage of light, the tubular body to fit around the burner, and the laterally and outwardly projecting flange or base constructed in one piece, for the purpose set forth.

2. In a base for burners, composed of material allowing the passage of light, the tubular body C and outwardly-projecting flange or base A, constructed in one piece, in combination with a suitable support, D, substantially as and for the purpose set forth.

3. The bottom or base A, and the rim or flange B, formed in one piece, and of material allowing the passage of light, as and for the purpose specified.

4. In a shade-holder, formed of material allowing the passage of light, formed in one piece, and having the bottom or base A provided on the inside with neck or flange C, and on the outside with flange B, substantially as and for the purpose set forth.

5. In a base or shade holder for burners, composed of material allowing the passage of light, and formed in one piece, the neck C, base or bottom A, and rim or flange B, in combination with a burner and suitable support D, substantially as and for the purpose set forth.

BENNETT B. SCHNEIDER.

Witnesses:

HENRY T. BROWN,
BENJAMIN W. HOFFMAN.